No. 682,092. Patented Sept. 3, 1901.
C. W. LEVALLEY.
CHAIN.
(Application filed Nov. 19, 1898.)
(No Model.)
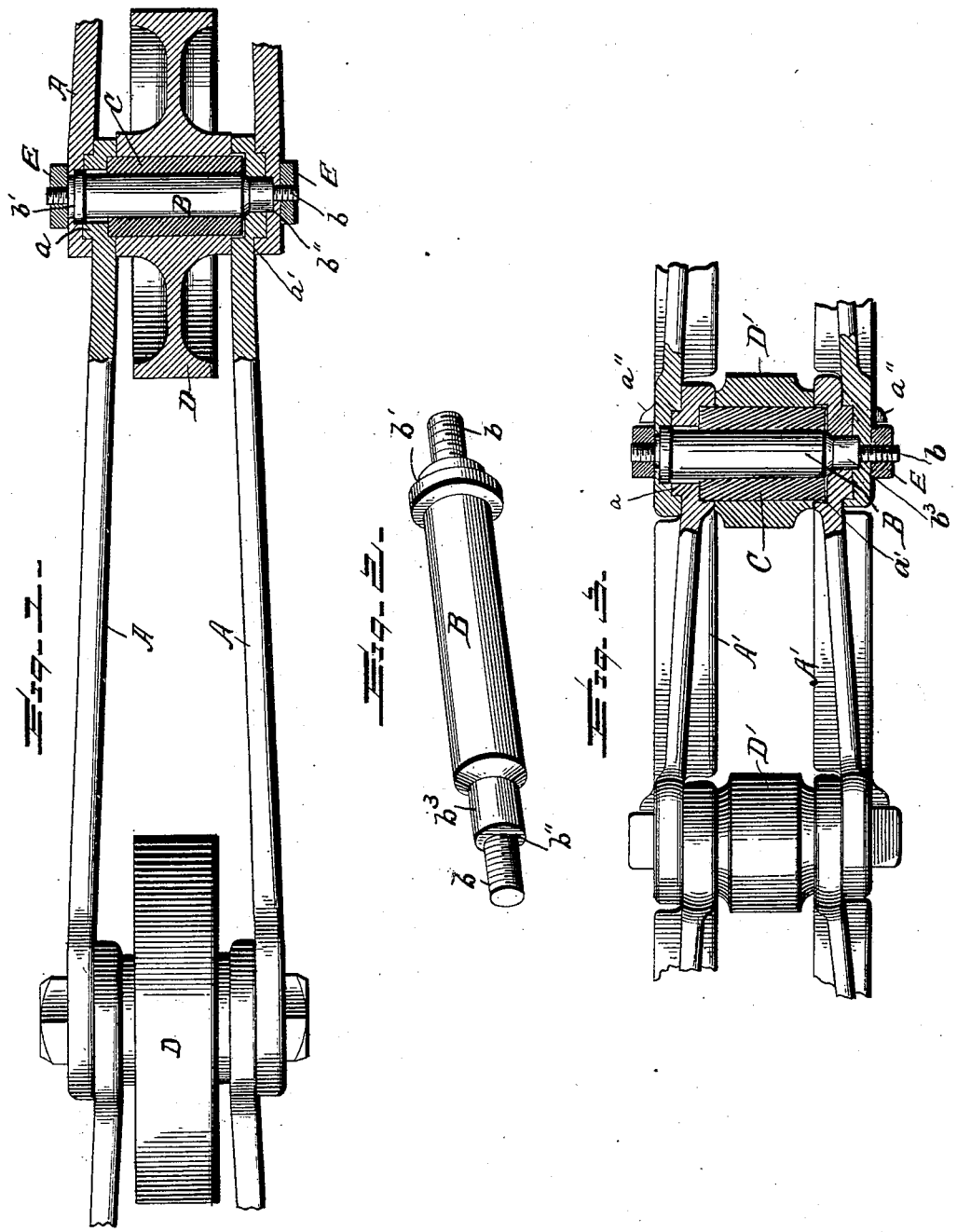

UNITED STATES PATENT OFFICE.

CHRISTOPHER W. LEVALLEY, OF MILWAUKEE, WISCONSIN.

CHAIN.

SPECIFICATION forming part of Letters Patent No. 682,092, dated September 3, 1901.

Application filed November 19, 1898. Serial No. 696,933. (No model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Chains, of which the following is a specification, reference being had therein to the accompanying drawings.

My invention relates to drive-chains comprising separate side bars and connecting cross pins or bolts which unite the side bars at the points of articulations of the chain and which are adapted to support the antifriction-wheels which run in engagement with the sprocket-teeth.

My invention is illustrated in the accompanying drawings, in which—

Figure 1 is a plan view, partly in horizontal section, of a form of chain embodying my improvements. Fig. 2 is a detached perspective view of the end bar or cross bolt or pin which serves to unite the side bars at the points of articulation. Fig. 3 is a plan view, partly in horizontal section, showing some of my improvements applied to a different form of chain from that represented in Fig. 1.

Referring to Fig. 1 of the drawings, A A represent the side bars, which are duplicates of each other. Each side bar is provided at one end with a recess adapted to receive a boss or short hub $a$, carried by the adjacent side bar. The recess and hub referred to are concentric with the aperture through which passes the end bar or connecting-bolt B, which unites the side bars.

C is a wearing barrel or thimble which fits quite closely upon the central portion of the end bar B. This wearing barrel or thimble is slightly longer than the distance between the inner faces of the side bars on the opposite sides of the chain, and its ends fit in recesses $a'$, formed therefor in the side bars.

D represents an antifriction-wheel mounted upon the wearing barrel or thimble C and arranged between the side bars of the chain. This wheel may be of relatively large size, as represented in Fig. 1, so that it will project below the side bars and may engage with a stationary track, over which the chain may pass, thus supporting the chain at points intermediate the wheels with which it engages. In Fig. 3 the wheel which is mounted upon the thimble C is designated D' and is of smaller size than the wheel represented in Fig. 1 and is adapted to act as an antifriction-roller with which the teeth of the sprocket or driving wheel for the chain engage. In Fig. 1 the side bars of the chain converge, and the opening between the side bars and the end bars is tapering. In many forms of chain, however, it is desirable that the openings between the side bars should be of substantially rectangular shape, and I then prefer to use the form of side bar shown in Fig. 3, (designated as A'.) This form of chain need not, however, be further described in its general features, as it forms the subject of my Patent No. 657,945, dated September 18, 1900. The connecting end bar B has its ends screw-threaded, as at $b$, to receive the nuts E. The bar is provided at its opposite ends with shoulders (designated $b'$ and $b''$) against which the outer side bars of the chain may be clamped by the nuts E. The shoulder $b'$ is preferably formed by a collar of a diameter larger than that of the main central part of the bar, while the shoulder $b''$ is preferably formed by the annular face of the bar which surrounds concentrically one of the screw-threaded portions $b$. I prefer that the end bar, bolt, or pin should have a portion $b^3$ adjacent to the shoulder $b''$ of a diameter intermediate between that of the main central portion and that of the screw-threaded part $b$. The inner face of one of the outer side bars is recessed to receive the collar $b'$, which constitutes one of the shoulders of the end bar, and the opposite end bar is recessed to receive the end of the intermediate part $b^3$ of the bar. It will be seen that the parts of the chain may be easily assembled when an end bar like that shown is employed, they being successively placed over the end bar from the smaller end—that is, the one bearing the shoulder $b''$. When the parts are properly assembled, the nuts E are screwed tightly upon the end bar and pinch or clamp the outer side bars A against the shoulders $b$ $b'$. While this results in practically locking the end bar and outer side bars together, it also serves to prevent the outer side bars being crowded too tightly against the articulating parts of the inner side bars, thus preventing the binding of the articulating parts of the chain, the end bar operating as a spacer to hold the side bars in proper working position.

The arrangement which I have just described operates also to tightly close the ends of the opening through which the end bar or bolt passes and will therefore prevent leakage of a lubricant and also prevent the entrance of dust and dirt to a very great extent. It also effectively serves to prevent any movement or turning of the end bar relative to the outer side bars, and hence unnecessary wear of these parts, while at the same time it leaves the parts perfectly free to articulate as required under working conditions. It will be understood that in the form of chain to which my invention is shown as being applied there is but little wear upon the connecting end bars, bolts, or pins, the wear at the joints of the chain being largely upon the interlocking annular flanges and recesses which are concentric with the end bars.

Ribs or lugs $a''$ may be employed to prevent the nuts E from turning off the cross or connecting bars. These lugs may be constructed as represented in my Patent No. 658,017, of September 18, 1900, or otherwise, as desired.

What I claim is—

1. In a chain, the combination of side bars which overlap at the joints and are formed with interlocking projections and recesses, the outer side bars beyond the said interlocking parts being formed with shouldered perforations, cross-bolts which pass through and unite the side bars at the joints of the chain, and are provided with shoulders with which the shoulders surrounding the said apertures in the outer side bars engage and by which the said side bars are spaced apart, and the cross-bolts being also provided with screw-threaded end portions which extend beyond the shoulders thereof, nuts engaging with the screw-threaded portions of the cross-bolts for clamping the outer side bars against the shoulders of the bolts, and wearing barrels or thimbles surrounding the cross-bolts and arranged between the inner side bars, substantially as set forth.

2. A chain comprising side bars which overlap one another at the joints of the chain, cross connecting bolts or bars for uniting the opposite side bars of the chain at the joints thereof, each bolt being provided near its ends with a shoulder and with a screw-threaded portion beyond the shoulder, and the side bars being provided with apertures for the passage of the cross connecting-bolts, the apertures in the outer bars being recessed, whereby there are formed shoulders adapted to fit against the shoulders of the connecting-bolts, and nuts which fit the screw-threaded ends of the connecting-bolts and are arranged to clamp the outer side bars tightly against the shoulders of the bolts, substantially as set forth.

In testimony whereof I affix my signature in presence of two witnesses.

CHRISTOPHER W. LEVALLEY.

Witnesses:
WM. C. FRYE,
VLASTA I. KLOFANDA.